US006978355B2

(12) United States Patent
Mowery et al.

(10) Patent No.: US 6,978,355 B2
(45) Date of Patent: Dec. 20, 2005

(54) CACHE MEMORY TRANSFER DURING A REQUESTED DATA RETRIEVAL OPERATION

(75) Inventors: Philip T. Mowery, Oklahoma City, OK (US); Kenny T. Coker, Mustang, OK (US)

(73) Assignee: Seagate Technology LLC, Scotts Valley, CA (US)

(*) Notice: Subject to any disclaimer, the term of this patent is extended or adjusted under 35 U.S.C. 154(b) by 372 days.

(21) Appl. No.: 10/121,774

(22) Filed: Apr. 11, 2002

(65) Prior Publication Data

US 2003/0093640 A1 May 15, 2003

Related U.S. Application Data

(60) Provisional application No. 60/338,200, filed on Nov. 13, 2001.

(51) Int. Cl.$^7$ .............................................. G06F 12/00
(52) U.S. Cl. .................................... 711/167; 711/113
(58) Field of Search ........................... 711/112, 100, 4, 711/113; 360/78.04, 78.05

(56) References Cited

U.S. PATENT DOCUMENTS

| 5,644,786 A | | 7/1997 | Gallagher et al. |
| 5,704,056 A | * | 12/1997 | Fujita et al. ................. 711/118 |
| 5,729,718 A | * | 3/1998 | Au .............................. 711/167 |
| 5,732,239 A | | 3/1998 | Tobagi et al. |
| 5,809,560 A | * | 9/1998 | Schneider .................... 711/204 |
| 5,950,212 A | | 9/1999 | Anderson et al. |
| 6,098,128 A | | 8/2000 | Velez-McCaskey et al. |
| 6,260,108 B1 | | 7/2001 | Barve et al. |
| 6,301,640 B2 | | 10/2001 | Barve et al. |
| 6,356,963 B1 | | 3/2002 | Maguire et al. |
| 6,437,937 B1 | * | 8/2002 | Guo et al. ................ 360/78.05 |
| 6,614,616 B1 | * | 9/2003 | Michel et al. ........... 360/78.04 |
| 6,754,682 B1 | * | 6/2004 | LeCrone et al. ............ 707/204 |
| 6,925,539 B2 | * | 8/2005 | Mowery et al. ............ 711/158 |
| 2003/0204692 A1 | * | 10/2003 | Tamer et al. ............... 711/163 |
| 2004/0088478 A1 | * | 5/2004 | Hall ........................... 711/112 |

* cited by examiner

Primary Examiner—Pierre-Michel Batalille
(74) Attorney, Agent, or Firm—Fellers, Snider, et al.

(57) ABSTRACT

Performing a cache only data transfer across a bus connecting a storage apparatus with a host concurrent with a period of bus availability while being incident within a time period for executing a connect host data transfer command. The time period for executing the connect host data transfer command is determined by a combination of a seek latency portion of the connect host data transfer command execution in combination with a rotation latency portion of the connect host data transfer command execution offset by a data transfer latency between the storage apparatus and the host in combination with an overhead time, wherein the overhead time is determined by a time for determining the time period for executing the connect host data transfer command in conjunction with a time for stopping an operation of the storage apparatus and transitioning to a new operation of the storage apparatus.

16 Claims, 4 Drawing Sheets

CACHE MEMORY TRANSFER DURING A REQUESTED DATA RETRIEVAL OPERATION

RELATED APPLICATIONS

This application claims priority to U.S. Provisional Application No. 60/338,200 filed Nov. 13, 2001, entitled Just In Time Read.

FIELD OF THE INVENTION

This invention relates generally to the field of magnetic data storage devices, and more particularly, but not by way of limitation, to improved data throughput for a disc drive.

BACKGROUND

Disc drives are used for data storage in modem electronic products ranging from digital cameras to computers and network systems. Typically, a disc drive includes a mechanical portion, or head disc assembly, and electronics in the form of a printed circuit board assembly mounted to an outer surface of the head disc assembly. The printed circuit board assembly controls functions of the head disc assembly and provides a communication interface between the disc drive and a host being serviced by the disc drive.

Typically, the head-disc assembly has a disc with a recording surface rotated at a constant speed by a spindle motor assembly and an actuator assembly positionably controlled by a closed loop servo system. The actuator assembly supports a read/write head that writes data to and reads data from the recording surface. Disc drives using magneto resistive read/write heads typically use an inductive element, or writer, to write data to information tracks of the recording surface and a magneto resistive element, or reader, to read data from the information tracks during drive operations.

The disc drive market continues to place pressure on the industry for disc drives with increased capacity at a lower cost per megabyte and higher rates of data throughput between the disc drive and the host. High performance disc drives achieve areal bit densities in the range of several gigabits per square centimeter (Gbits/cm$^2$). Higher recording densities can be achieved by increasing the number of bits per centimeter stored along each information track, and/or by increasing the number of tracks per centimeter written across each recording surface. Capacity increases gained by increasing the number of tracks per centimeter on each recording surface generally require improvements in servo control systems, which enable the read/write heads to be more precisely positioned relative to the information tracks. Capacity increases gained through increasing the bits per centimeter stored on each track generally require improvements in the read/write channel electronics to enable data to be written to and subsequently read from the recording surface at a correspondingly higher frequency, and typically foster a need for improvements in the interface channel electronics for improved bit transfer rates.

Under a typical queued command environment architecture for a host interface channel of a disc drive, requested read data that must be retrieved from the media requires synchronization between the host interface channel of the disc drive and the drive interface channel of the host in order to steam the read data almost immediately to the drive interface channel of the host. A problem with this method of handling data read requests is that the drive interface channel of the host is connected with the host interface channel of the disc drive exclusively while the data is recovered from the media.

For any media access, the access time is governed primarily by the seek time and by the rotational latency. Since seek times are generally in the millisecond time frame, the disc drive cannot transmit or receive other data while the drive interface channel of the host is connected with the host interface channel of the disc drive. In a queued command environment, there is no host transfer activity permitted during this access time and this can result in a significant decrease in overall data transfer rate. This problem also exists for non-WCE (Write Cache Enabled) writes since the final status transfer of the host interface channel of the disc drive maintains control over the drive interface channel of the host until the disc write operation completes.

As such, challenges remain and a need persists for improvements in data throughput between the disc drive and the host. It is to this and other features and advantages set forth herein that embodiments of the present invention are directed.

SUMMARY OF THE INVENTION

As exemplified by preferred embodiments, the present invention provides for improving data throughput for a storage apparatus by initiating a seek operation in response to a connect host data transfer command, determining a time period for executing the connect host data transfer command based on the seek operation and using a predetermined equation, executing a host only data transfer command concurrent with a period of bus availability incident within the time period, and synchronizing a drive interface channel of a host with a host interface channel of the storage apparatus for transfer of a data responsive to the connect host data transfer command as part of a method for improving data throughput of the storage apparatus.

These and various other features and advantages, which characterize the present invention, will be apparent from a reading of the following detailed description and a review of the associated drawings.

DETAILED DESCRIPTION

Figure 1:
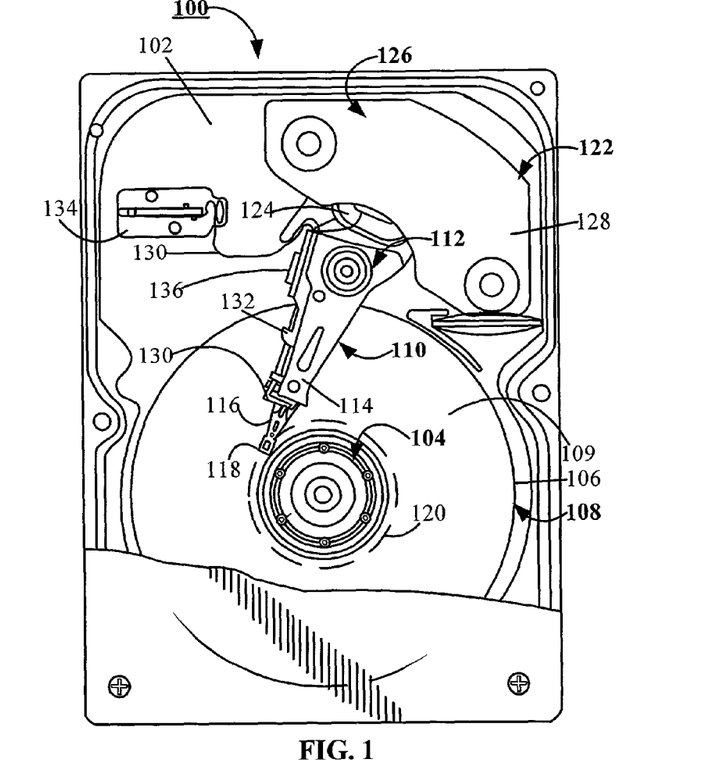
FIG. 1 is a top plan view of a disc drive that incorporates a just-in-time read process in accordance with a method of the present invention.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The actuator assembly 110 includes an actuator arm 114 that supports a load arm 116, which in turn supports at a read/write head 118 corresponding to the rotatable recording surface 109. The rotatable recording surface 109 is divided into concentric information tracks 120 (only one depicted) over which the read/write head 118 is positionably located. The information tracks 120 support head position control information written to embedded servo sectors (not separately depicted). Between the embedded servo sectors are data sectors (not separately depicted) used for storing bit patterns or data. The read/write head 118 includes a reader element (not separately shown) offset radially and laterally from a writer element (not separately shown). The writer element writes data to the concentric information tracks 120 during write operations of the disc drive 100, while the reader element controls the positioning of the read/write head 118 relative to the concentric information tracks 120 during operations of the disc drives 100.

The terms "servoing" and "position-controlling," as used herein, mean maintaining control of the read/write head 118 relative to the rotating recording surfaces 109 during operation of the disc drive 100. Servoing to or on the information track 120, the actuator assembly 110 is controllably positioned by a voice coil motor assembly 122 (also referred to a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write head 118 are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) mounted to the underside of the basedeck 102. The flex circuit containment channel 132 also supports read/write signal circuitry including preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
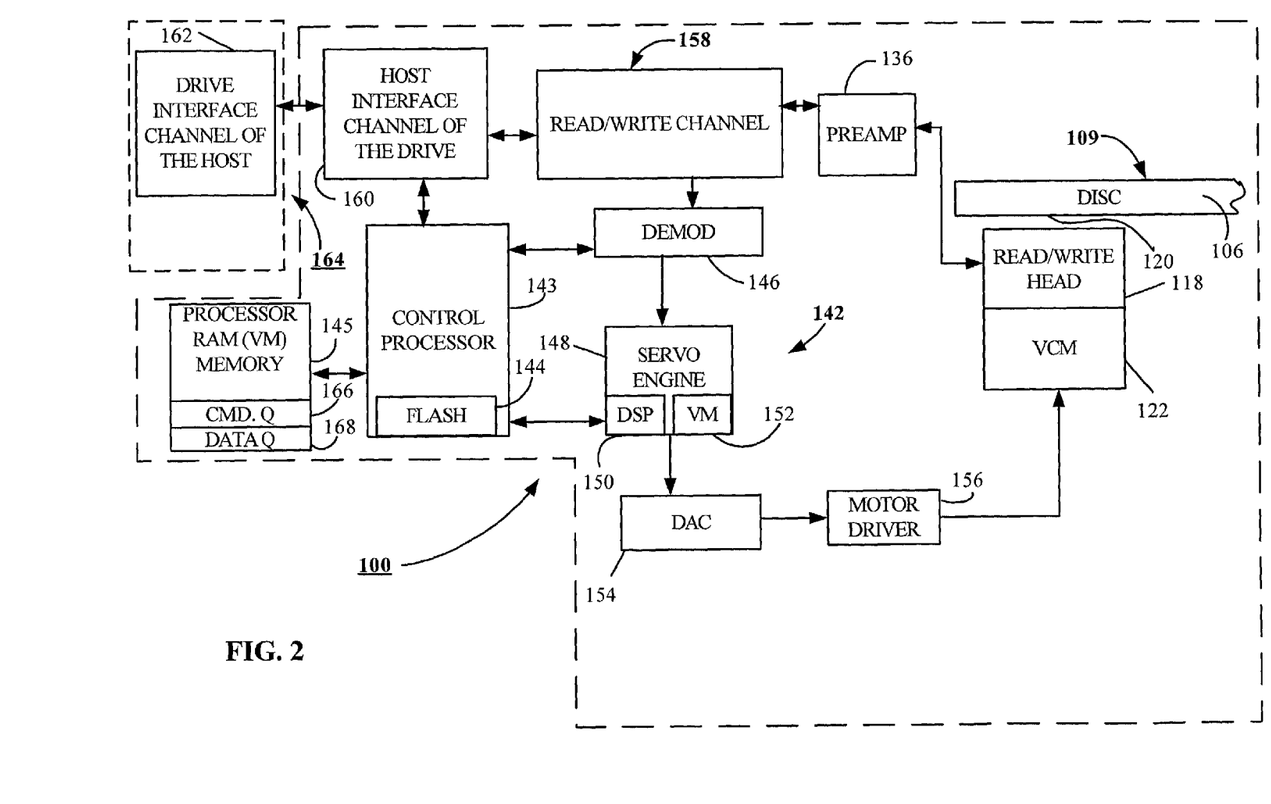
FIG. 2 is a functional block diagram of control circuitry of the disc drive of FIG. 1.

Turning to FIG. 2, position-controlling of the read/write head 118 is provided by the positioning mechanism (not separately shown) operating under the control of a servo control circuit 142 programmed with servo control code, which forms a servo control loop. The servo control circuit 142 includes a control processor 143 with a flash memory portion 144 for use by the control processor 143, a volatile memory or random access memory (VM) 145, a demodulator (demod) 146, an application specific integrated circuit (ASIC) hardware-based servo controller ("servo engine") 148 with digital signal processor portion (DSP) 150 and a volatile memory or random access memory (VM) 152 portion, a digital to analog conveter (DAC) 154 and a motor driven circuit 156. Optionally, the functions of the flash memory 144, the servo engine 148, the digital signal processor 150 and the volatile memory 152 may all be contained, along with random access memory 145, within the control processor 143. Typically, a portion of the random access memory 145 is used as a cache for data read from the information track 120 awaiting transfer to a host connected to the disc drive 100 and for data transferred from the host to the disc drive 100 to be written to the information track 120. The components of the control circuit 142 are utilized to facilitate track following algorithms for the actuator assembly 110 (of FIG. 1) and more specifically for controlling the voice coil motor 122 in position-controlling the read/write head 118 relative to the selected information track 120 (of FIG. 1).

The demodulator 146 conditions head position control information transduced from the information track 120 of the rotatable recording surface 109 to provide position information of the read/write head 118 relative to the information track 120. The servo engine 148 generates servo control loop values used by the control processor 143 in generating command signals such as seek signals used by voice coil motor 122 in executing seek commands. Control loop values are also used to maintain a predetermined position of the actuator assembly 110 during data transfer operations. The command signals generated by the control processor 143 are converted by the digital to analog converter 154 to analog control signals. The analog control signals are used by the motor driver circuit 156 in position-controlling the read/write head 118 relative to the selected information track 120, during track following, and relative to the recording surface 109 during seek function.

The read element of the read/write head 118 responds to bit patterns written to the servo sectors as well as bit patterns written to the data sectors of the information track 120 by generating a signal, also referred to as a read signal. The signal is passed to the preamplifier 136, where the amplitude of the signal is increased and then passed to the read/write channel 158, which processes the signal and passes data contained within the signal to a host interface channel 160 of the disc drive 100 for transfer to a drive interface channel 162 of a communication bus of a host 164 (the communication bus not shown separately).

In a preferred embodiment, the architectural environment of the disc drive 100 is a queued command environment, the control processor 143 controls a "just-in-time" read method (to be discussed more fully below) that improves utilization of the drive interface channel 162 of the host 164 and the host interface channel 160 of the disc drive 100 during a seek and rotational latency portion of a data read operation of the disc drive 100. Under the just-in-time read method, once the disc drive 100 has received and placed a data read command from the host 164 into a command queue block 166 of the cache portion of the random access memory 145, the drive interface channel 162 of the host 164 is temporarily disconnected from a synchronized connection with the host interface channel 160 of the disc drive 100 and commences with a data read operation.

Each command queue block 166 of the cache portion of the random access memory 145 is associated with and connected to a data queue block 168 of the cache portion of the random access memory 145 that is assigned by the control processor 143 to the command queue block 166 for receipt of read data during the data read operation. The data read operation typically comprises a seek latency portion, a rotational latency portion and a data transfer latency portion. The data transfer latency portion is generally determined to he an amount of time it takes to transfer a sufficient amount of the data being read from the recording surface 109 into the data queue block 168 that will allow an uninterrupted transfer of data from the data queue block 168 to the host 164 by the time the remaining data being read from the recording surface 109 is transferred into data queue block 168.

Upon commencement of the read data operation to retrieve data requested by the data read command from the recording surface 109, the control processor 143 checks to see if the communication bus is free, and if the communication bus is free, the control processor 143 reestablishes the synchronized connection between the drive interface channel 162 of the host 164 and the host interface channel 160 of the disc drive 100, i.e., the control processor 143 reestablishes the bus connection between the host 164 and the disc drive 100. Once the bus connection has been reestablished, write data can be transferred from the host 164 to the cache portion of the random access memory 145 and speculative data held in the cache portion of the random access memory 145 can be transferred to the host 164 during the seek latency portion, the rotational latency portion and data transfer latency portion of the data read operation. Speculative data comprises pre fetch and post fetch data such as data remaining in the cache portion of the random access memory 145 from prior data read access requests or data transferred to the cache portion of the random access memory 145 as a result of an execution of a read-look-ahead caching algorithm. Once sufficient data transferred into the data queue black 168 from the recording surface 109 to allow an uninterrupted transfer of data from the data queue block 168 to the host 164, the data queue block 168 is reconnected and synchronized "just-in-time" through the host interface channel 160 of the disc drive 100 to the drive interface change 162 of the host 164 to synchronize transferring of data read from the recording surface 109 directly to the host 164.

The just-in-time read method allows firmware (not shown separately) of the disc drive 100 to utilize the drive interface channel 162 of the host and the host 164 interface channel 160 of the disc drive 100 for cache only transfers. By permitting cache only transfers during data read operation, the overall data throughput performance between the host 164 and the disc drive 100 improves.

During operation of the disc drive 100, any time a data read access request for data is required and the request has reached the top of the command queue, a timer in the drive firmware (not shown separately) is enabled. The timer is based on a prediction of when the drive interface channel 162 of the host 164 will be required to transmit data requested by the data read access request from the cache portion of the random access memory 145 to the host 164. The prediction is described by the following equation:

$$T = \text{Lat}_{sk} + \text{Lat}_{rot} - \text{Lat}_{dat} - OH \qquad \text{Equation (1)}$$

Where:
T=Time until the Host channel is needed
$\text{Lat}_{sk}$=Seek Latency, (how long the seek will take).
$\text{Lat}_{rot}$=Rotational Latency, (how long the read head takes to get over the target media).
$\text{Lat}_{dat}$=Data Transfer Latency (a worst-case timing for a host transfer, i.e., how long to transfer a cache hit to or from the host).
OH=Overhead required to make the calculation, stop the current operations, and transition to the new task.

When a read data operation commences, the timer is enabled and the drive firmware is allowed to execute any cache only operations until the timer expires. When the timer expires, the drive firmware waits until any cache only operations completes and then reconnects and synchronizes the command queue block 166 with its connected data queue block 168 through the host interface channel 160 of the disc drive 100 to the drive interface channel 162 of the host 164 and starts the data transfer from the cache portion of the random access memory 144 to the host 164.

Figure 3:
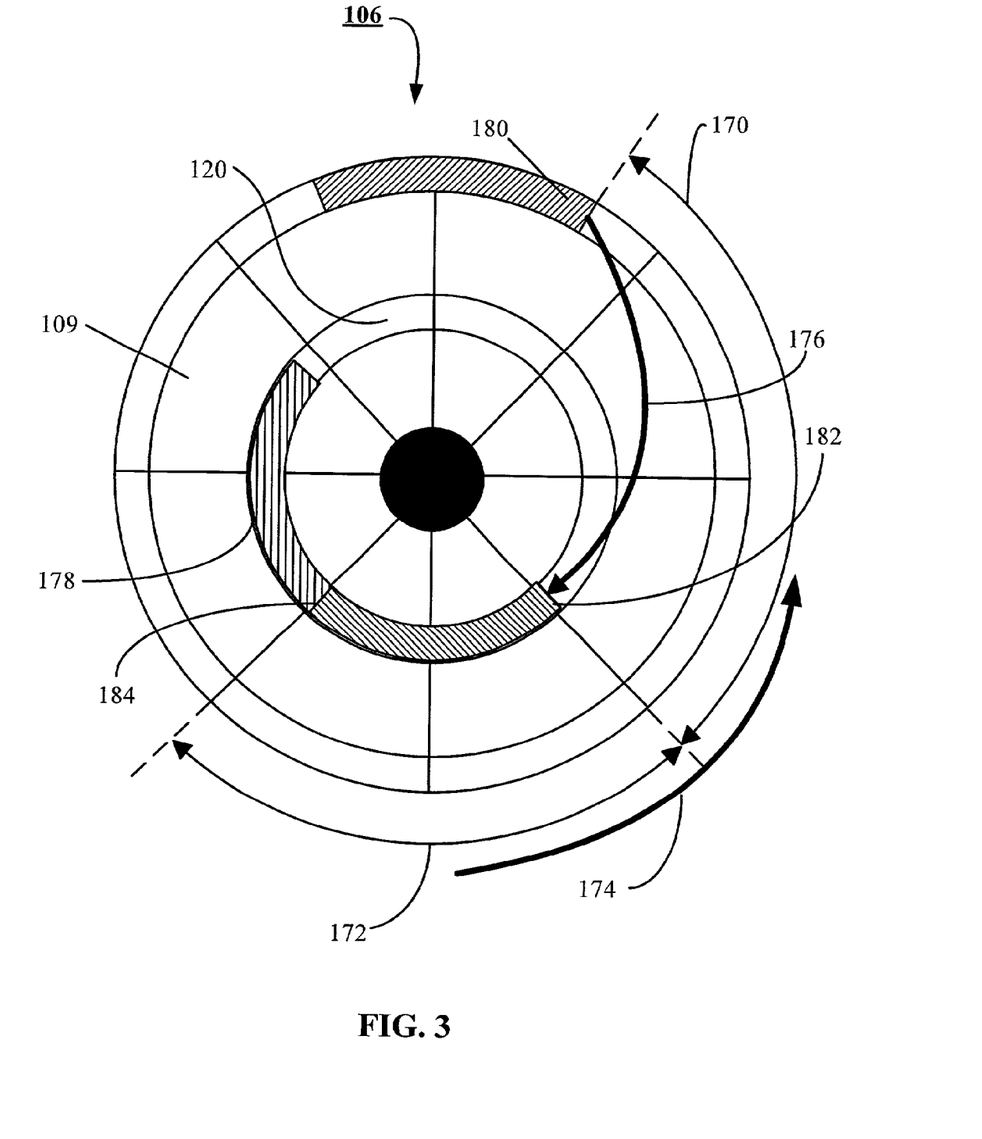
FIG. 3 is a diagratumatic representation of seek latency and rotational latency encountered during a data read operation of the of the disc drive of FIG. 1.

FIG. 3 shows a seek latency portion 170 of a data read operation and a rotational latency portion 172 of the read data operation. Vector 174 shows the direction of rotation of the recording surface 109 Vector 176 shows a path followed by the read/write head 118 when executing a seek operation to data 178 written to the recording surface 109, the seek operation is in response to a second data transfer request. The seek operation commences at the end of reading the data 180 following a first data transfer and terminates with the read/write head 118 coming on track at information track 120 and reading a first header 182 encountered by the read/write head 118. The amount of time used for completion of the seek operation is the seek latency 170.

After completion of a seek operation, the amount time taken for header information 184 of the data 178 to rotate beneath the read/write head 118 is rotational latency 172.

Figure 4:
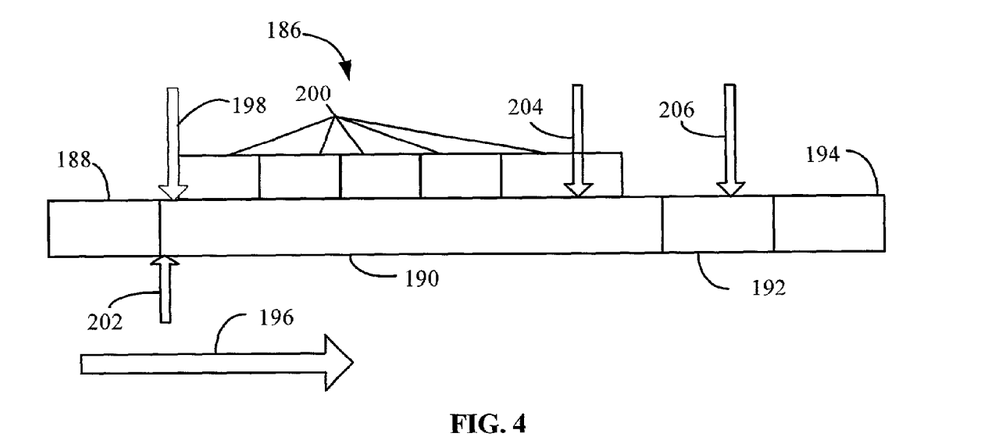
FIG. 4 is a timeline illustrating of an algorithm used in setting a firmware timer for implementing the just-in-time read process within the disc drive of FIG. 1.

FIG. 4 shows a data read operation timeline 186 depicting events that occur over time in an embodiment of the present invention responding to a connect host data transfer command. A command that requires dedication of both to drive interface channel 162 of the host 164 and the host interface channel 160 of the disc drive 100 channels to complete is referred to herein as a connected host data transfer command. The response of the disc drive 100 to to connect host data command commences with a command overhead portion 188 of a seek command, continues with a seek and rotational latency portion 190 followed by a disc transfer portion 192 and concluding with a command termination overhead portion 194. A time sequence direction or order of events depicted for the disc read operation, as depicted by the timeline 186, is shown by vector 196. A vector 198 depicts a point in time during the disc read operation that cache only transfers, also referred to as host only data transfers or cache hits 200 may commence. Commencement of cache hits 200 are permitted to occur at a point in time following an issuance of a seek command. Issuance of a seek command is depicted by vector 202. Vector 204 shows an expiration of the time T equation (1) from above that signifies a point in time during the data read operation that no new cache hits 200 may commence. Vector 206 shows a point in time during the disc transfer portion 192 that synchronization between the drive interface channel 162 of the host 164 and the host interface channel 160 of the disc drive 100 reoccurs to permit a just-in-time transfer of data read from the recording surface 109 to the host 164.

The connected host data transfer command becomes eligible for execution when it reaches the top of the command queue 166 and has access to both the drive interface channel 162 of the host 164 and the host interface channel 160 of the disc drive 100.

Cache hits 200, either transfer of data from the host 164 to the cache portion of the random access memory 145 of the disc drive 100 or transfer of data from the cache portion of the random access memory 145 of the disc drive 100 to the host 164 may occur internal to an execution of a connected host data transfer command because synchronization of the command queue block 166 with its connected data queue block 168 through the host interface channel 160 of the disc drive 100 to the drive interface channel 162 of the host 164 is not required to effect the transfer.

Figure 5:
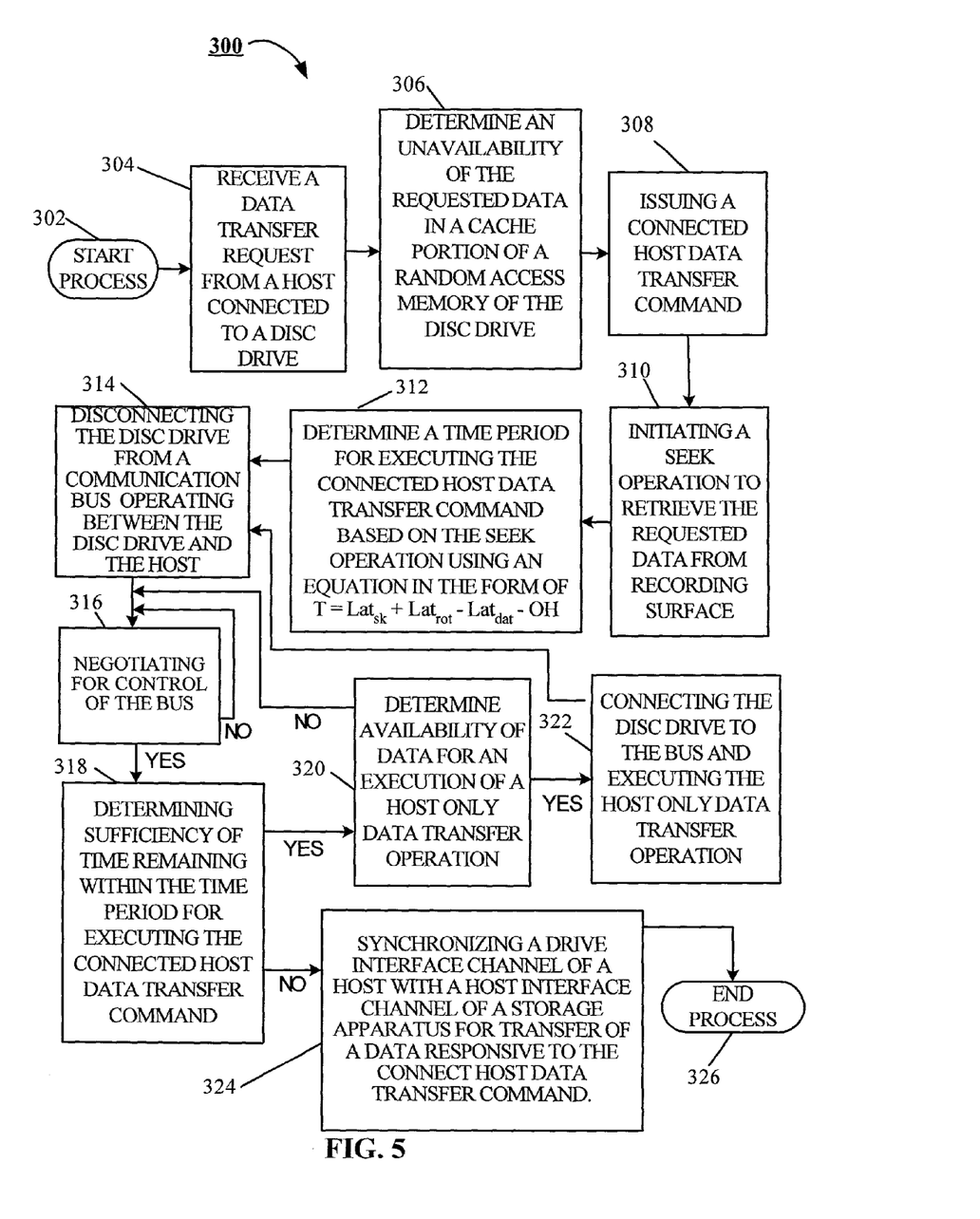
FIG. 5 is a flow chart of a method for executing a host only data transfer operation during an execution of a connect host data transfer command for the disc drive of FIG. 1.

FIG. 5 depicts data transfer process 300 for executing a host only data transfer operation during an execution of a connect host data transfer command beginning at process step 302. At process step 304 a disc drive (such as 100) receives a data transfer request from a host (such as 164) connected to the disc drive by communication bus. Upon receipt of the data transfer request the disc drive determines an availability of the requested data in a cache portion of a random access memory (such as 145) of the disc drive. If the disc drive determines the requested data is unavailable in the cache portion of the random access memory, the data transfer process 300 continues with an issuance of a host data transfer command at process step 308.

At process step 310, a seek operation to retrieve the requested data from a recording surface (such as 109) of the disc drive is initiated. At process step 312 of the data transfer process 300, a time period for executing the connected host data transfer command is determined based on the seek operation initiated at process step 310 and incorporates a use of a predetermined equation (such as equation 1).

At process step 314, a control processor (such as 143) of the disc drive disconnects the disc drive from the communication bus operating between the disc drive and the host upon commencement of the seek operation. Next, the disc drive negotiates for control of the bus at process step 316. If the bus is unavailable, the disc drive repeats the negotiation until a bus available response is received from the host.

Upon receipt of a bus available response from the host, the data transfer process 300 continues at process 318 with a determination of sufficiency of time remaining within the time period for executing the connected host data transfer command for an execution of a host only data transfer. If sufficient time remains for a host only data transfer, the data transfer process 300 continues at process step 320 with a determination of an availability of data for an execution of a host only data transfer and if data is available for execution of a host only data transfer the data transfer process 300 continues with process step 322 by connecting the disc drive to the bus and executing the host only data transfer operation. If data is unavailable for execution of a host only data transfer, the disc drive returns to the negotiating mode of process step 316. If insufficient time remains for host only data transfer, the data transfer process proceeds to process step 324.

At process step 324, a command queue block (such as 166) of the random access memory along with a data queue block (such as 168) of the random access memory connected to the command queue block is synchronized through a host interface channel (such as 160) of the disc drive to a drive interface channel (such as 162) of the host for transfer of a data responsive to the connect host data command from the cache portion of the random access memory to the host. Following the transfer of the data responsive to the connected host data command, the data transfer process 300 concludes at end process step 326.

Accordingly, embodiments of the present invention are directed to improving data throughput for a storage apparatus. In accordance with one embodiment, steps of initiating a seek operation in response to a connect host data transfer command (such as step 310), determining a time period for executing the connect host data transfer command based on the seek operation and using a predetermined equation (such as 312), executing a host only data transfer command concurrent with a period of bus availability incident within the time period (such as step 322), and synchronizing a drive interface channel of a host with a host interface channel of the storage apparatus for transfer of a data responsive to the connect host data transfer command (such as 324) are part of a method for improving data throughput of the storage apparatus.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method for operating a storage apparatus comprising the steps of:
   receiving a data transfer command with respect to a data storage medium;
   completing the data transfer command by moving a transfer device to an addressable location of the data storage medium and transferring data in relation to the data storage medium, wherein an interval between beginning the moving step and ending the transferring step defines a latency period; and
   executing a cache only data transfer during the latency period.

2. The method of claim 1 wherein the latency period comprises a seek latency defining an interval associated with the moving the transfer device from a reference position to a destination track that comprises the addressable location.

3. The method of claim 2 wherein the latency period comprises a rotation latency defining an interval associated with moving the destination track to operably position the addressable location in a data transfer relationship with the transfer device.

4. The method of claim 3 wherein the latency period comprises an offsetting data transfer latency defining an interval associated with caching transferred data.

5. The method of claim 4 wherein the latency period comprises an offsetting processing overhead latency.

6. A method comprising steps of initiating a data retrieval operation to transfer first data requested by a device from a first memory space to a second memory space for subsequent transfer to the device, and simultaneously transferring second data between said second memory space and the device after beginning the transfer of the first data and before completing the transfer of the first data.

7. The method of claim 6, wherein the first memory space comprises a rotatable data storage medium and the data retrieval operation comprises a seek operation to position a data transducer adjacent the medium.

8. The method of claim 6, wherein the second memory space comprises a cache memory.

9. The method of claim 6, wherein the transferring second data step comprises establishing a connection with the device over a bus and transferring said second data using said connection.

10. The method of claim 9, wherein the transferring second data step further comprises determining a time period associated with the data retrieval operation and performing the transferring said second data using said connection step when the time period is of sufficient length to complete said step.

11. The method of claim 6, wherein the second data comprises readback data from the first memory space, and wherein the transferring second data step comprises transferring the second data from the second memory space to the device.

12. The method of claim 6, wherein the second data comprises write data to be written to the first memory space, and wherein the transferring second data step comprises transferring the second data from the device to the second memory space.

13. A storage apparatus comprising:
an interface channel providing a data transfer request;
a servo system executing a requested data seek operation in relation to selected addressable locations of a data storage medium in response to the data transfer request; and
a control processor programmed to transfer data across the interface channel, prior to a completion of the requested data seek operation, by steps for transferring a cache only data simultaneously during the requested data seek operation.

14. The apparatus of claim 13, in which the steps for transferring cache only data during the requested data seek operation comprises:
(a) initiating the requested data seek operation in response to the data transfer request;
(b) determining a time period for responding to the data transfer request based on the requested data seek operation; and
(c) transferring the cache only data during a period of bus availability incident within the time period for responding to the data transfer request.

15. The apparatus of claim 14, in which the cache only data is a first cache only data, wherein the bus is a communication bus operating between the apparatus and the interface channel, and in which transferring the cache only data during the period of bus availability incident within the time period for responding to the data transfer request comprises the steps of:
(c1) negotiating for control of the bus;
(c2) verifying a sufficient time remains within the time period for transfer of the first cache only data;
(c3) transferring the first cache only data during the period of bus availability;
(c4) verifying a sufficient time remains within the time period for transfer of a cache only data subsequent to the first cache only data; and
(c5) transferring the subsequent cache only data during the period of bus availability.

16. The apparatus of claim 14, in which the cache only data is a first cache only data, and in which transferring the cache only data during the period of bus availability incident within the time period for responding to the data transfer request comprises the steps of:
(c1) negotiating for control of the bus;
(c2) verifying a sufficient time remains within the time period for transfer of the first cache only data;
(c3) transferring the first cache only data during the period of bus availability;
(c4) verifying an insufficient time remains within the time period for transfer of a cache only data subsequent to the first cache only data; and
(c5) preparing for a conclusion of the data transfer request.

* * * * *

UNITED STATES PATENT AND TRADEMARK OFFICE
CERTIFICATE OF CORRECTION

PATENT NO. : 6,978,355 B2 Page 1 of 1
DATED : December 20, 2005
INVENTOR(S) : Philip T. Mowery et al.

It is certified that error appears in the above-identified patent and that said Letters Patent is hereby corrected as shown below:

<u>Title page,</u>
Item *Primary Examiner*, replace "Batalille" with -- Bataille --.

<u>Column 1,</u>
Line 65, replace "steam" with -- stream --.

<u>Column 2,</u>
Line 50, replace "diagratumatic" with -- diagrammatic --.

<u>Column 5,</u>
Line 45, replace "data transferred" with -- data is transferred --.
Line 46, replace "black" with -- block --.

<u>Column 6,</u>
Line 28, replace "109 Vector" with -- 109. Vector --.
Line 44, replace "both to drive" with -- both the drive --.

Signed and Sealed this

Eleventh Day of April, 2006

JON W. DUDAS
*Director of the United States Patent and Trademark Office*